No. 743,854.   Patented November 10, 1903.

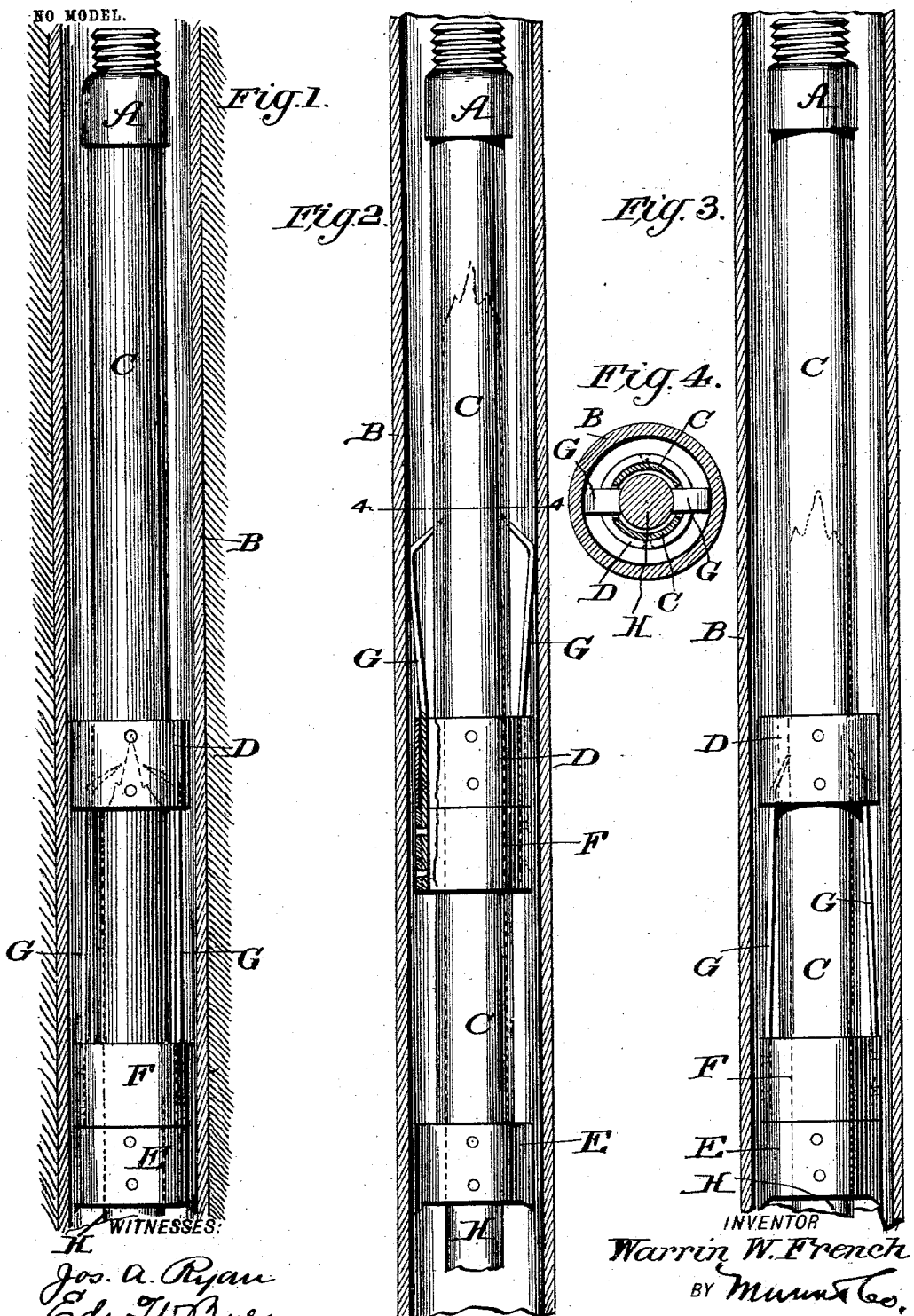

UNITED STATES PATENT OFFICE.

WARRIN W. FRENCH, OF VANDERBILT, MICHIGAN.

WELL-ROD EXTRACTOR.

SPECIFICATION forming part of Letters Patent No. 743,854, dated November 10, 1903.

Application filed March 30, 1903. Serial No. 150,342. (No model.)

*To all whom it may concern:*

Be it known that I, WARRIN WILLBUR FRENCH, a citizen of the United States, residing at Vanderbilt, in the county of Otsego and State of Michigan, have invented a new and useful Improvement in Well-Rod Extractors, of which the following is a specification.

The object of my invention is to provide a simple and practical device for extracting from well-casings the working rod whenever it becomes broken or uncoupled at a point low down in the well.

My invention consists in the novel construction and arrangement of a clutch device, which I will now proceed to describe with reference to the drawings, in which—

Figure 1 is a side elevation of the device shown in the well-casing and about to be applied to the broken end of the working rod. Fig. 2 is a similar view showing the second stage of the application of the clutch device, which has now passed down over the broken end of the working rod. Fig. 3 shows the third stage of action of the clutch device, which has now been closed by a lifting movement which tightly grips the end of the working rod; and Fig. 4 is a cross-section on the line 4 4 of Fig. 2.

In the drawings, B represents the well-casing, and H represents a lower section of the working rod, which has become broken off.

A C D E F G represent the several parts of my extractor. This consists of two parallel side members C C, (see Fig. 4,) united at the top at A and provided with a screw-coupling to connect with the rod by which it is operated. To the lower portion of the two side members C C are rigidly connected by rivets two fixed collars D and E. Between these collars and guided on the sides C C is a loose reciprocating collar F, to which are rigidly attached two stout upwardly-projecting spring-arms G G, whose upper ends are turned inwardly and made with chisel edges adapted to clutch and grip the working rod. These spring clutch-arms lie on opposite sides and in the spaces between the side members C C.

The operation of this extractor is as follows: It is lowered into the well-casing in the position shown in Fig. 1 until the inturned ends of the clutch-arms strike the top of the broken or uncoupled working rod. When this happens, this end of the working rod forces up the arms G and their attached collar F, which slide up on the side members C C until said collar F strikes the collar D, which acts as a stop. This allows the clutch-arms G G to expand and pass down over the working rod, as seen in Fig. 2. Now when a lifting strain is applied to my extractor through its parts A C C the collar D, which is attached thereto, rides up on the spring-clutches G, forcing them inwardly and tightly gripping the working rod, and finally the lower collar E takes up against the collar F, as seen in Fig. 3, and the extractor is now firmly attached to the broken rod and the latter may be lifted out.

Having thus described my invention, what I claim as new, and desire to secure by Letters Patent, is—

1. A well-rod extractor comprising a body portion having two side members with two collars rigidly attached to the lower ends of the same and spaced apart as described, a sliding collar arranged on the side members between the two rigidly-attached collars and spring clutch-arms attached at their lower ends to the sliding collar and extending upwardly inside of the upper rigid collar and arranged as described to work between the side members to grip the well-rod substantially as shown and described.

2. A well-rod extractor comprising a body portion having two side members united at the top and provided with a screw-coupling and having two collars at the lower end connecting the side members and spaced apart as described, a sliding collar arranged on the side members between the two rigid collars and having upwardly-projecting clutch-arms extending through the upper collar and disposed between the side members substantially as shown and described.

3. A well-rod extractor comprising body part with two parallel side members, two transverse stops attached to the lower ends of the side member and spaced apart as described and a slide arranged on the side members between the two stops and having upwardly-projecting clutch-arms extending inside the upper stop and playing in the open spaces between the side members substantially as shown and described.

In testimony whereof I have signed my name to this specification in the presence of two subscribing witnesses.

W. W. FRENCH.

Witnesses:
W. L. TOWNSEND,
H. H. MORROW.